United States Patent
Yamada

(10) Patent No.: US 7,729,593 B2
(45) Date of Patent: Jun. 1, 2010

(54) IMAGE AND SOUND OUTPUT SYSTEM, IMAGE AND SOUND DATA OUTPUT DEVICE, AND RECORDING MEDIUM

(75) Inventor: Norihiko Yamada, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 350 days.

(21) Appl. No.: 11/531,482

(22) Filed: Sep. 13, 2006

(65) Prior Publication Data

US 2007/0065112 A1 Mar. 22, 2007

(30) Foreign Application Priority Data

Sep. 16, 2005 (JP) ............... 2005-271035

(51) Int. Cl.
| | |
|---|---|
| H04N 7/087 | (2006.01) |
| H04N 5/91 | (2006.01) |
| H04N 7/00 | (2006.01) |
| H04N 5/93 | (2006.01) |
| G11B 27/00 | (2006.01) |
| H04N 9/475 | (2006.01) |

(52) U.S. Cl. ............... 386/84; 386/46; 386/54; 386/61; 386/66; 386/71; 386/75; 386/95; 386/98; 348/512; 348/515

(58) Field of Classification Search ............ 386/84, 386/95, 98, 46, 54, 61, 66, 71, 75; 348/512, 348/515

See application file for complete search history.

(56) References Cited

U.S. PATENT DOCUMENTS 6,587,641 B1 * 7/2003 Maehashi et al. ........... 386/111
6,862,044 B2    3/2005 Kariatsumari
2001/0008531 A1 * 7/2001 Lanigan et al. ............. 370/432
2002/0174440 A1 * 11/2002 Usuba et al. ............... 725/110

FOREIGN PATENT DOCUMENTS

| JP | A-7-59030 | 3/1995 |
|---|---|---|
| JP | A-2002-290932 | 10/2002 |
| JP | A 2002-344898 | 11/2002 |
| JP | A 2004-69996 | 3/2004 |
| JP | A-2004-320424 | 11/2004 |

* cited by examiner

*Primary Examiner*—Thai Tran
*Assistant Examiner*—Daquan Zhao
(74) *Attorney, Agent, or Firm*—Oliff & Berridge, PLC

(57) ABSTRACT

An image and sound output system includes an image and sound data output device, and an image display device that is connected to the image and sound data output device through a transmission path. Further, the image and sound data output device includes an image and sound data separating unit, an image data transmitting unit that transmits the separated image data to the image display device, a sound data output unit that outputs the separated sound data, an image data analyzing unit that analyzes image data transmitted to the image display device by the image data transmitting unit, a sound output adjusting time creating unit, and a sound output synchronization adjusting unit. Furthermore, the image display device includes an image data receiving unit that receives image data transmitted by the image and sound data output device, an image processing unit.

4 Claims, 12 Drawing Sheets

IMAGE AND SOUND OUTPUT SYSTEM, IMAGE AND SOUND DATA OUTPUT DEVICE, AND RECORDING MEDIUM

BACKGROUND

1. Technical Field

The present invention relates to an image and sound output system, to an image and sound data output device, and to a recording medium.

2. Related Art

In recent times, with an image process by a computer improved, a system has been suggested in which an image process having been generally performed by an image display device is performed by the computer, a format of image process data after the image process is converted into a digital format, the image process data is transmitted to an image display device, such as a projector, and an image is displayed by the image display device (for example, see JP-A-2004-69996 (FIG. 1)).

In this system, a serial transmission interface, such as USB or IEEE 1394, is used as a transmission path. When comparing a cable for connecting the serial transmission interface with a general RGB video cable or the like according to the related art, since the cable for connecting the serial transmission interface is thin, it can be easily installed. Therefore, it is expected that the serial transmission interface has been increasingly used as the transmission path.

Meanwhile, image display devices, such as projectors, have been mainly used for a home theater or the like There are cases in which image data obtained by performing an image process using the above-described computer is outputted to the image display device to be displayed thereon. It is considered that a moving picture, such as a video image or a game image, is displayed on an image display device, and a sound according to the moving picture is reproduced and outputted by a data output device, such as the computer.

In this case, the moving picture data is transmitted and received through a serial transmission path between the image display device and the data output device. At this time, the moving picture data is transmitted after being encoded in a format suitable for transmission.

Since the moving picture data is encoded, a decoding process needs to be performed so as to restore an original moving picture in the display device, and both the image display device and the data output device need to perform a buffer process for appropriately transmitting the encoded data at the time of transmission.

At the time of performing the buffer process and the decoding process, and scanning and forming images, a unique process time of the image display device necessarily needs to be ensured. Therefore, in a case in which the data output device transmits the moving picture data to the image display device, and at the same time, a sound attached to the moving picture is reproduced and outputted, reproducing output of the sound data may be earlier than reproducing output of the moving picture, and moving picture output timing and sound output timing, that is, so-called lip-sync does not coincide, which results in applying uncomfortable feeling to viewers.

In order to solve these problems, another system as been suggested in which delay time information based on a unique delay element in a video display device, that is, information of a time necessary until video data is received and then displayed is transmitted to a video and audio output device or an audio adjusting device, such as an amplifier, and a delay buffer of each element is appropriately operated on the basis of the delay time information (for example, see JP-A-2002-344898 (FIG. 4)).

However, according to a technology disclosed in JP-A-2002-344898, a predetermined communication process needs to be performed between devices so as to transmit and receive delay time information, and a communication processing program that becomes a scheme for performing a communication process should be installed in each device. As a result, the development cost and the manufacture cost of each device may increase.

SUMMARY

An advantage of some aspects of the invention is that it provides an image and sound output system, an image and sound data output device, a sound processing program, and a recording medium having recorded thereon the sound processing program, in which image output timing and sound output timing can be ensured without loading a specific communication processing program on an image display device connected to the image and sound data output device.

According to a first aspect of the invention, an image and sound output system includes an image and sound data output device capable of outputting image and sound data, and an image display device that is connected to the image and sound data output device through a transmission path and displays an image on the basis of the image data outputted by the image and sound data output device. The image and sound data output device includes an image and sound data separating unit that separates the image data and the sound data included in the image and sound data, an image data transmitting unit that transmits the separated image data to the image display device through the transmission path, a sound data output unit that outputs the separated sound data, an image data analyzing unit that analyzes image data transmitted to the image display device by the image data transmitting unit and reproduced by the image display device so as to obtain the analyzed result, a sound output adjusting time creating unit that creates a sound output adjusting time according to a time, in which the image data is reproduced on the image display device, on the basis of the analyzed result by the image data analyzing unit, and a sound output synchronization adjusting unit that adjusts sound output by the separated sound data in synchronization with timing of reproducing an image displayed by the image display device, on the basis of the sound output adjusting time created by the sound output adjusting time creating unit. The image display device includes an image data receiving unit that receives image data transmitted by the image and sound data output device, an image processing unit that performs a reproducing process on the image data received by the image data receiving unit, and an image forming unit that forms an image on the basis of the image data processed by the image processing unit.

In this case, moving picture compression data is considered as the image data. For example, moving picture data that is compressed in compression formats, such as MPEG2, MPEG4, MotionJPEG, is considered.

Further, at the time of calculating a reproducing time by the reproducing time calculating unit, for example, a predetermined function according to the moving picture data format is set, and the reproducing time may be calculated on the basis of the predetermined function. Further, the reproducing time may be calculated while referring to a lookup table in which a reproducing time according to the compression format is recorded, which will be described in detail below.

According to the aspect of the invention, by means of the sound output synchronization adjusting unit, synchronization between the image output and the sound output is taken by an internal process at the image and sound data output device side. Therefore, although delay time information is not processed by a sound board and a sound data output device, such as a speaker, which is connected to the sound board, the image output timing and the sound output timing can coincide with each other. Accordingly, a scheme, such as a program for processing the delay time information, does not need to be mounted in each device, such as an image display device, and thus the development cost and the manufacture cost of each device can be reduced.

Further, since the sound output adjusting time according to the compression format of the image data is created by the image data analyzing unit, the sound can be outputted with optimal timing according to the compression format of the image data.

Preferably, the image and sound data output device further includes a reproducing time recording unit having a lookup table in which a reproducing time according to any one of a resolution and a bit rate of the image data or a combination of the resolution and the bit rate of the image data is recorded. The sound output adjusting time creating unit refers to the lookup table recorded in the reproducing time recording unit so as to create a sound output adjusting time.

According to this configuration, the reproducing time according to the resolution and the bit rate of the moving picture that is affected by the reproducing time in the image display device is recorded on the lookup table. Therefore, on the basis of the format of the image data obtained by the image data analyzing unit, the sound output adjusting time creating unit can create simply the sound output adjusting time while referring to the lookup table.

Preferably, the transmission path enables bidirectional communication to be performed. Preferably, the image display device further includes a display state setting unit that sets a display state of an image formed by the image forming units and a setting information transmitting unit that transmits the information set by the display state setting unit to the image and sound data output device through the transmission path. The image processing unit performs a reproducing process on the image data on the basis of the information set by the display state setting unit. The image and sound data output device further includes a setting information receiving unit that receives the setting information transmitted by the image display device, and a process time calculating unit that calculates an image processing time by the image processing unit of the image display device on the basis of the setting information received by the setting information receiving unit. The sound output adjusting time creating unit adds the image processing time calculated by the process time calculating unit so as to create a sound output adjusting time.

In this case, as setting of the display state by the display state setting unit in the image display device, for example, IP (interlace to Progressive) conversion, scaling, γ correction are considered.

According to this configuration, the image display device includes the setting information transmitting unit, and the image and sound data processing device includes a setting information receiving unit and a process time calculating unit. When the setting of the display state at the image display device side is changed, the sound output adjusting time creating unit also adds the image processing time to create the sound output adjusting time. Therefore, the sound can be outputted with timing closer to the image output timing.

According to a second aspect of the invention, there is provided an image and sound data output device, which is capable of outputting image and sound data, and outputs the image data to an image display device connected to the image and sound data output device through a transmission path enabling bidirectional communication so as to display images. The image and sound data output device includes an image and sound data separating unit that separates the image data and the sound data included in the image and sound data, an image data transmitting unit that transmits the separated image data to the image display device through the transmission path, a sound data output unit that outputs the separated sound data, an image data analyzing unit that analyzes image data transmitted to the image display device by the image data transmitting unit and reproduced by the image display device so as to obtain the analyzed result, a sound output adjusting time creating unit that creates a sound output adjusting Lime according to a time, in which the image data is reproduced on the image display device, on the basis of the analyzed result by the image data analyzing unit, and a sound output synchronization adjusting unit that adjusts sound output by the sound data output unit based on the separated sound data in synchronization with timing of reproducing an image displayed by the image display device, on the basis of the sound output adjusting time created by the sound output adjusting time creating unit.

According to a third aspect of the invention, there is provided a computer readable recording medium which is used in an image and sound data output device capable of outputting image and sound data and outputting the image data to an image display device connected to the image and sound data output device through a transmission path so as to display images, and in which sound output adjusting time creating data by a sound output adjusting time creating unit is recorded. The image and sound data output device includes an image and sound data separating unit that separates the image data and the sound data included in the image and sound data, an image data transmitting unit that transmits the separated image data to the image display device through the transmission path, a sound data output unit that outputs the separated sound data, an image data analyzing unit that analyzes image data transmitted to the image display device by the image data transmitting unit and reproduced by the image display device so as to obtain the analyzed result, the sound output adjusting time creating unit that creates a sound output adjusting time according to a time, in which the image data is reproduced on the image display device, on the basis of the analyzed result by the image data analyzing unit, and a sound output synchronization adjusting unit that adjusts sound output by the sound data output unit based on the separated sound data in synchronization with timing of reproducing an image displayed by the image display device, on the basis of the sound output adjusting time created by the sound output adjusting time creating unit. The computer readable recording medium includes a lookup table in which a reproducing time according to any one of a resolution and a bit rate of the image data or a combination of the resolution and the bit rate of the image data is recorded.

According to a fourth aspect of the invention, there is provided a computer readable recording medium having recorded thereon the sound processing program. The sound processing program is used in an image and sound data output device, such as a computer, so as to operate essential elements as functional units.

Preferably, reproducing time data according to any one of a resolution and a bit rate of the image data or a combination of the resolution and the bit rate of the image data is carried in the sound processing program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the preferred embodiments of the invention will be described in detail with reference to the accompanying drawings.

First Embodiment

Figure 1:
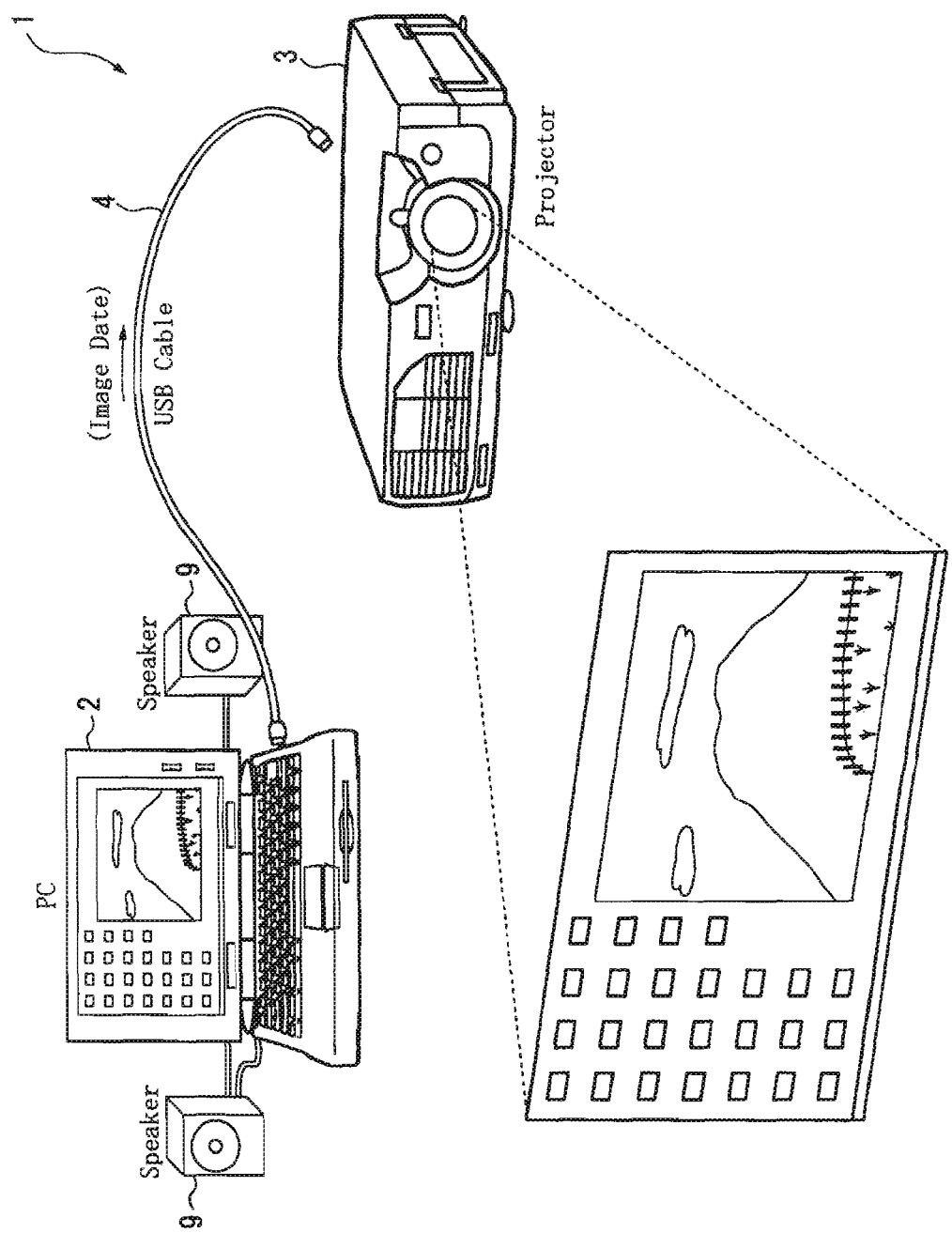
FIG. 1 is a schematic perspective view illustrating a structure of an image and sound output system according to a first embodiment of the invention.

FIG. 1 shows an image and sound output system 1 according to a first embodiment of the invention. The image and sound output system 1 includes a computer 2 that serves as an image data output device, a projector 3 that serves as an image display device, and a USB cable 4 that serves as a transmission path connecting the computer 2 and the projector 3. In the image and sound output system 1, image data outputted by the computer 2 is inputted to the projector 3 through the USE cable 4, and an image on a local display of the computer 2 can be displayed on a screen as a projection image. Further, in the computer 2, a speaker 9 that is connected to a sound card built in the computer 2 is provided, and the speaker 9 outputs sounds according to a moving picture in the image projected by the protector 3.

The USB cable 4 is a cable that is based on standards, such as a USB 1.1, a USB 2.0, which enables bidirectional communication to be performed between a connecting apparatus and a connected apparatus.

Structure of Computer

Figure 2:
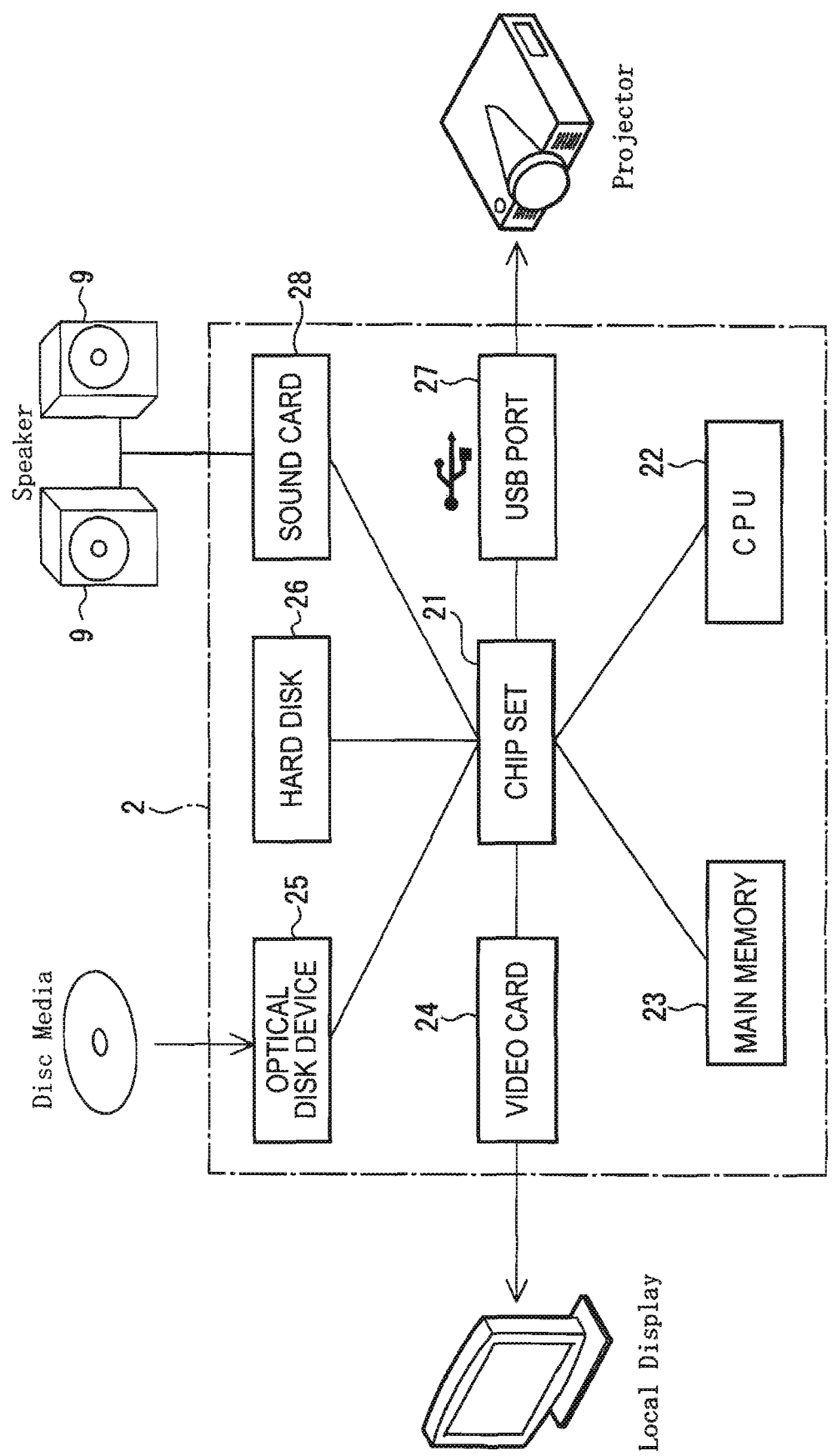
FIG. 2 is a schematic view illustrating a structure of an image and sound data output device according to the first embodiment of the invention.

As shown in FIG. 2, the computer 2 that serves as an image data output device includes a chipset 21 that is provided on a mother board, and a CPU 22, a main memory 23, a video card 24, an optical disk device 25, a hard disk device 26, a USE port 27, and a sound card 28 that are connected to the chip set 21 through bus lines.

The CPU 22 serves as an operation processing unit that executes various programs while using the main memory 23 as a work region. Although not shown in FIG. 2, graphic data or the like that is created by executing an operating system or the like is created in the CPU 22.

The video card 24 performs an image process on the image data that is inputted to the computer 2 and performs image display on a local display that is attached to the computer 2. Although not shown, the video card 24 includes a processor that performs an image process for outputting data to the local display, and a video memory that stores image data to be processed. In the first embodiment, the computer 2 includes the local display, but the local display may not be provided in the computer 2. Further, the video card 24 is not necessarily a separate device, but it may be built in the chipset 21 and may perform a graphic function.

The optical disk device 25 reproduces optical disk media, such as a compact disk (CD), a digital versatile disc (DVD) or the like. When inserting an optical disk where compressed moving picture data is stored, the optical disk device 25 reproduces the moving picture data stored in the optical disk, and outputs the moving picture data to the main memory 23 attached to the CPU 22 through the chipset 21.

The hard disk device 26 is a storage device that stores programs executed by the CPU 22 or data created by operating the computer 2. Also, image data can be stored in the hard disk device 26, and output the stored image data according to instructions of programs operating on the CPU 2.

The USB port 27 is a terminal of the side of the computer 2 through which the above-described USB cable 4 is connected to the computer 2, and input and output control of the USB port 27 is performed by the above-described chipset 21. The USB port 27 and the chipset 21 function as a data transmitting unit in this embodiment.

The sound card 28 converts sound data of a digital format decoded by the CPU 22 into sound data of an analog format, amplifies the sound data, and outputs the sound through the speaker 9, which will be described in detail below. Also, the sound card 28 does not necessarily need to be a separate device, and it may be built in the chipset 21 and may perform a sound process function.

Figure 3:
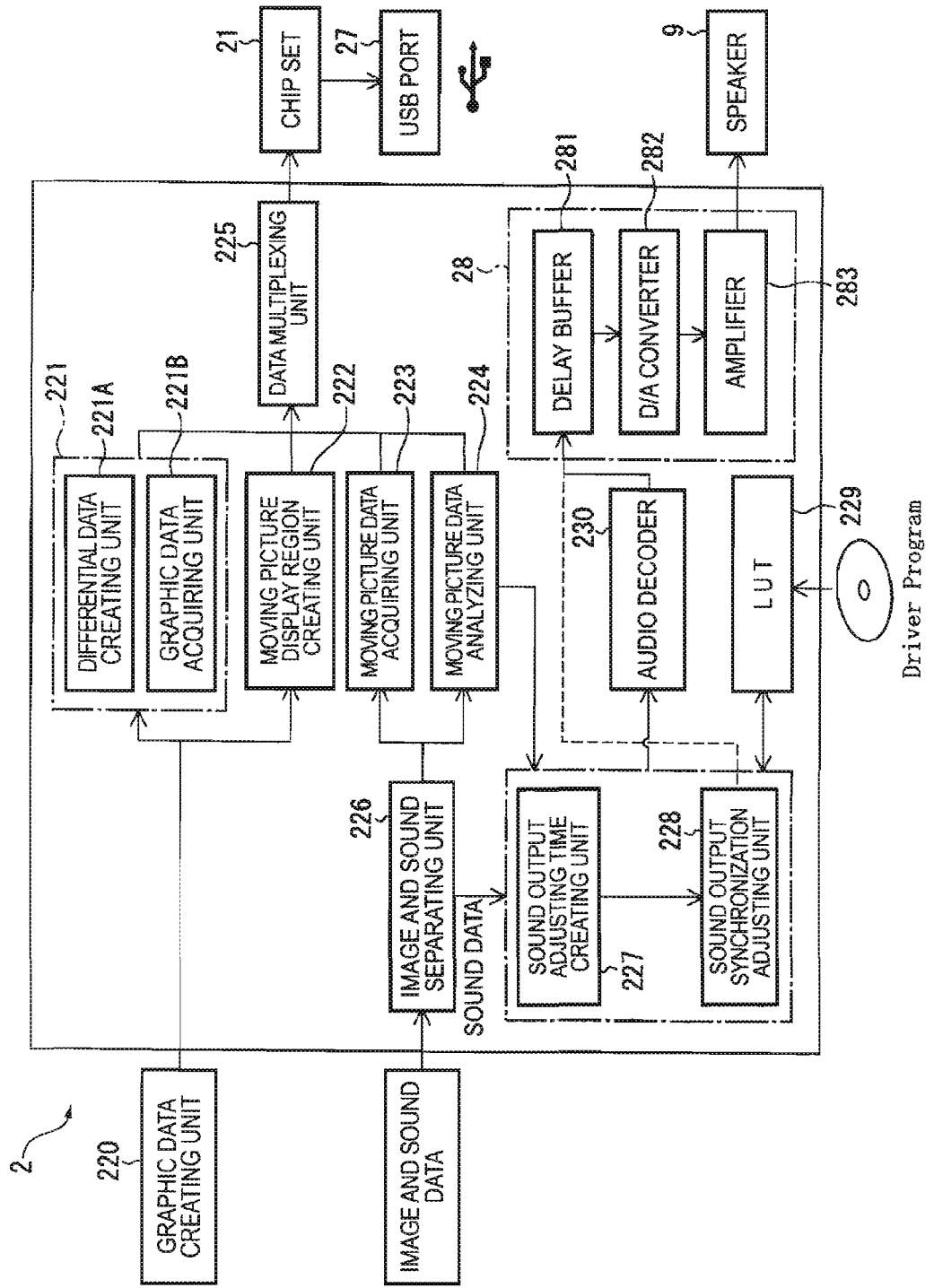
FIG. 3 is a functional block diagram illustrating an image data output device according to the first embodiment of the invention.

When performing an image and sound process on graphic image data inputted by the above-described CPU 22 and image and sound data outputted in a type of a stream, an image and sound processing program that includes functional units shown in FIG. 3 is executed on the CPU 22. Specifically, the above-described CPU 22 includes a graphic image data acquiring unit 221, a moving picture display region creating unit 222, a moving picture data acquiring unit 223, a moving picture data analyzing unit 224, a data multiplexing unit 225, an image and sound separating unit 226, a sound output adjusting time creating unit 227, a sound output synchronization adjusting unit 228, a look up table (LUT) 229, and an audio decoder 230.

The graphic image data acquiring unit 221 acquires graphic data that is created by a graphic data creating unit 220 operating on the operating system, and includes a differential data creating unit 221A and a graphic data acquiring unit 221B.

The differential data creating unit 221A creates differential data of a graphic image that is updated with a cycle of a refresh rate of the computer 2. For example, the differential data creating unit 221A captures images before and after updating, compares the captured images before and after updating with each other, and creates a varied portion as differential data.

The graphic data acquiring unit 221B acquires the differential data created by the differential data creating unit 221A as graphic data, and outputs the acquired graphic data to the data multiplexing unit 225, which will be described in detail below.

From the inputted graphic data, the moving picture display region creating unit 222 acquires a portion where moving picture data is displayed on the graphic screen on the basis of the inputted graphic data. For example, the moving picture display region creating unit 222 creates moving picture display region data that indicates a location where the moving picture data is displayed in the graphic image, a size in which the moving picture data is displayed in the graphic image, and a resolution in which the moving picture data is displayed in the graphic image.

The moving picture data acquiring unit 223 acquires moving picture data MPG that is sequentially inputted by the optical disk device 25 or the hard disk device 26 as bit streams, as moving picture data in a compressed state, without decoding the moving picture data MPG. As compression formats of the moving picture data, MPEG 2, MPEG 4, Motion JPEG, or the like may be exemplified.

The moving picture data analyzing unit 224 acquires image attribute information for image display, such as a frame rate, a bit rate, an aspect ratio, a resolution, which is included in the input moving picture data. The acquired image attribute information may be used for example in controlling timing at the time of an image data transmitting process. For example, when the compression format of the moving picture data is MPEG 2, the image attribute information of the moving picture data is recorded in a sequence header or a sequence extension of an MPEG 2 bit stream or the like, and the moving picture data analyzing unit 224 acquires information recorded in the header portion so as to acquire image attribute information of the moving picture.

Further, the moving picture data analyzing unit 224 outputs the above-described analyzed result to the sound output adjusting time creating unit 227, which will be described in detail below.

The data multiplexing unit (multiplexer) 225 multiplexes graphic data acquired by the graphic image data acquiring unit 221, moving picture display region data created by the moving picture display region creating unit 222, and moving picture data acquired by the moving picture data acquiring unit 223. As a multiplexing method, a method, such as MPEG-TS (Transport system) or MPEG-PS (Program Stream), which is defined by ISO/IEC-13818-1, may be adopted. At this time, the data multiplexing unit 225 can multiplex image correcting data, such as a color, a 7 value, or the like, which is set on the computer 2.

In addition, the data that is multiplexed by the data multiplexing unit 225 is transmitted from the USB port 27 as serial data through the chipset 21 to be then outputted from the USB port 27.

The image and sound separating unit 226 that serves as an image and sound data separating unit serves as a multiplexer that separates sound data included in the inputted image and sound data. In the first embodiment, the image data that is separated by the computer 2 is not decoded, but the sound data is decoded.

On the basis of the analyzed result of the moving picture data by the moving image data analyzing unit 224, the sound output adjusting time creating unit 227 calculates a time until the moving image data is reproduced and displayed in the projector 3, and creates a sound output adjusting time for delaying sound output. Further, the sound output adjusting time creating unit 227 searches the LUT 229 on the basis of image attribute information, such as the bit rate, the resolution of the moving picture data inputted by the moving picture data analyzing unit 224.

Figure 4:
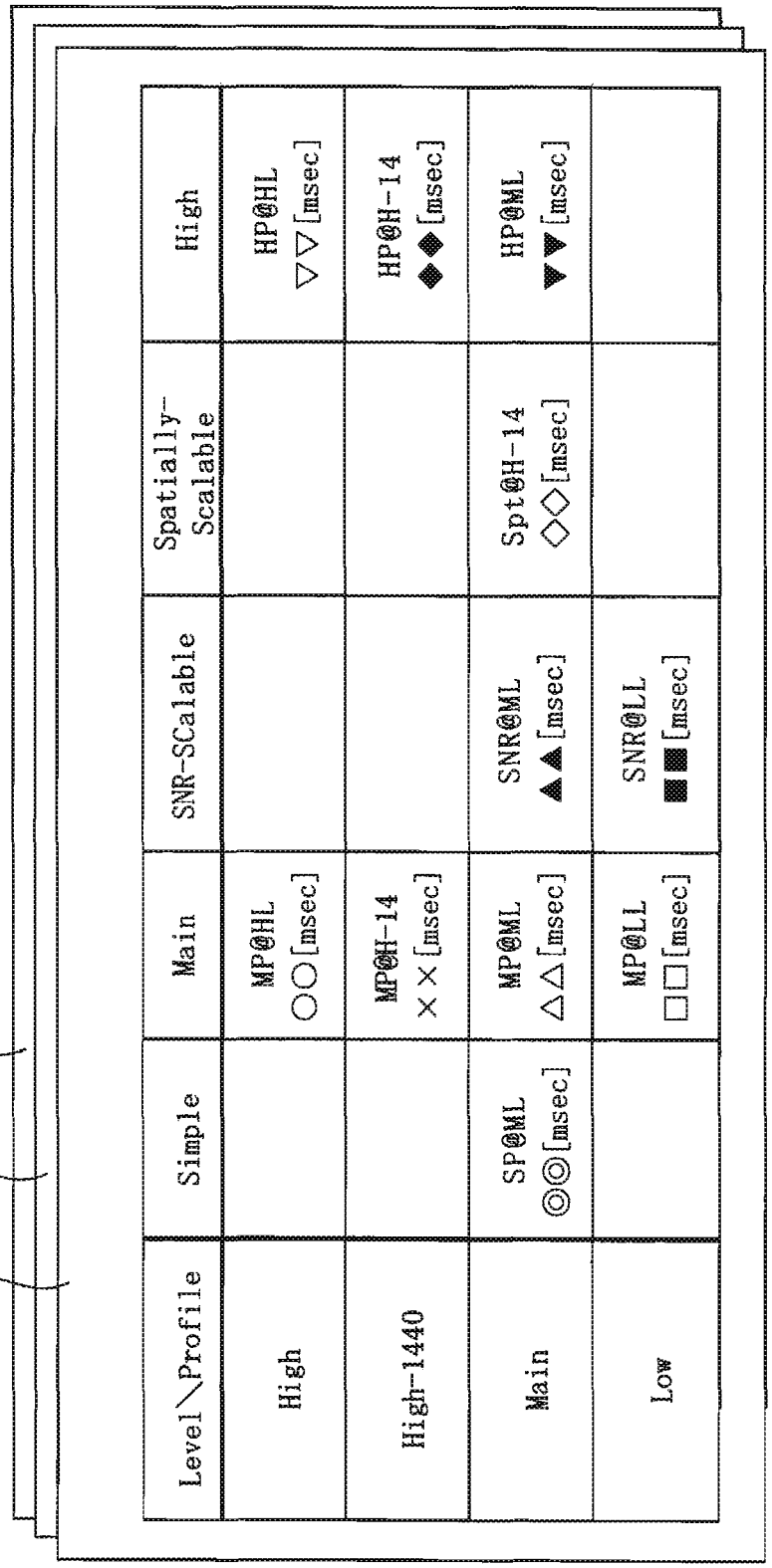
FIG. 4 is a schematic view illustrating a structure of a lookup table that is provided in an image and sound data output device according to the first embodiment of the invention.

In the LUT 229 that serves as a reproducing time recording unit, LUT1, LUT2, LUT3, . . . according to compression formats of moving picture data are stored, as shown in FIG. 4. In the case of the LUT1 that corresponds to the MPEG 2, a level in the same standard is stored in a row side, a profile is stored in a column side, and a reproducing time according to a corresponding level and a corresponding profile is stored in each cell. The reproducing time is stored as a time until the moving picture data performed by the projector 3 is decoded, display raster data is created, and a protected image is formed, and it is set according to the projector 3. As shown in FIG. 3, the LUT 229 is provided as a driver program by an optical disk or the internet downloading.

Further, the driver program may be created in such a manner that it can be referenced in any way. Also, an execution file may be initially held by the computer 2, and the driver program may be data having a table structure that can be referenced by the execution file. Also, the driver program may be a computer executable program in which data related to the LUT 229 is carried.

In addition, on the basis of information, such as, the profile or the level of the inputted moving picture data, or the bit rate or the resolution from the analyzed result by the moving picture data analyzing unit 224, the sound output adjusting time reproducing unit 227 searches the inside of the LUT 229 and acquires the reproducing time according to the inputted moving picture data.

If the reproducing time is acquired, the sound output adjusting time creating unit 227 creates a sound output adjusting time for delaying the sound output on the basis of the acquired reproducing time. The created sound output adjusting time is outputted to the sound output synchronization adjusting unit 228.

The sound output synchronization adjusting unit 228 adjusts timing of sound output according to timing at the time of forming a moving picture by the projector 3 on the basis of the created sound output adjusting time. In the first embodiment, the sound output synchronization adjusting unit 228 adjusts and controls the sound card 8, which will be described in detail below.

The audio decoder 230 decodes the sound data that is separated by the image and sound separating unit 226, and the decoded sound data is outputted to the sound card 28.

As described above, the sound card 28 that serves as the sound output unit converts the sound data of a digital format decoded by the audio decoder 230 into the sound signal of an analog format, amplifies the sound signal, and outputs the sound signal through the speaker 9. The sound card 28 includes a delay buffer 281, a D/A converter 282, and an amplifier 283.

The delay buffer 281 stores the sound data that is decoded by the audio decoder 230, and sequentially outputs the stored sound data to the D/A converter 282 according to adjustment control instructions from the sound output synchronization adjusting unit 228.

The D/A converter 282 converts the sound data of a digital format stored in the delay buffer 281 into the sound signal of an analog format and outputs it.

The amplifier 283 amplifies the sound signal whose format is converted into an analog format by the D/A converter 282 such that it is outputted through the speaker 9. As a result, the decoded sound data is outputted from the speaker 9 as a sound.

Structure of Projector

Figure 5:
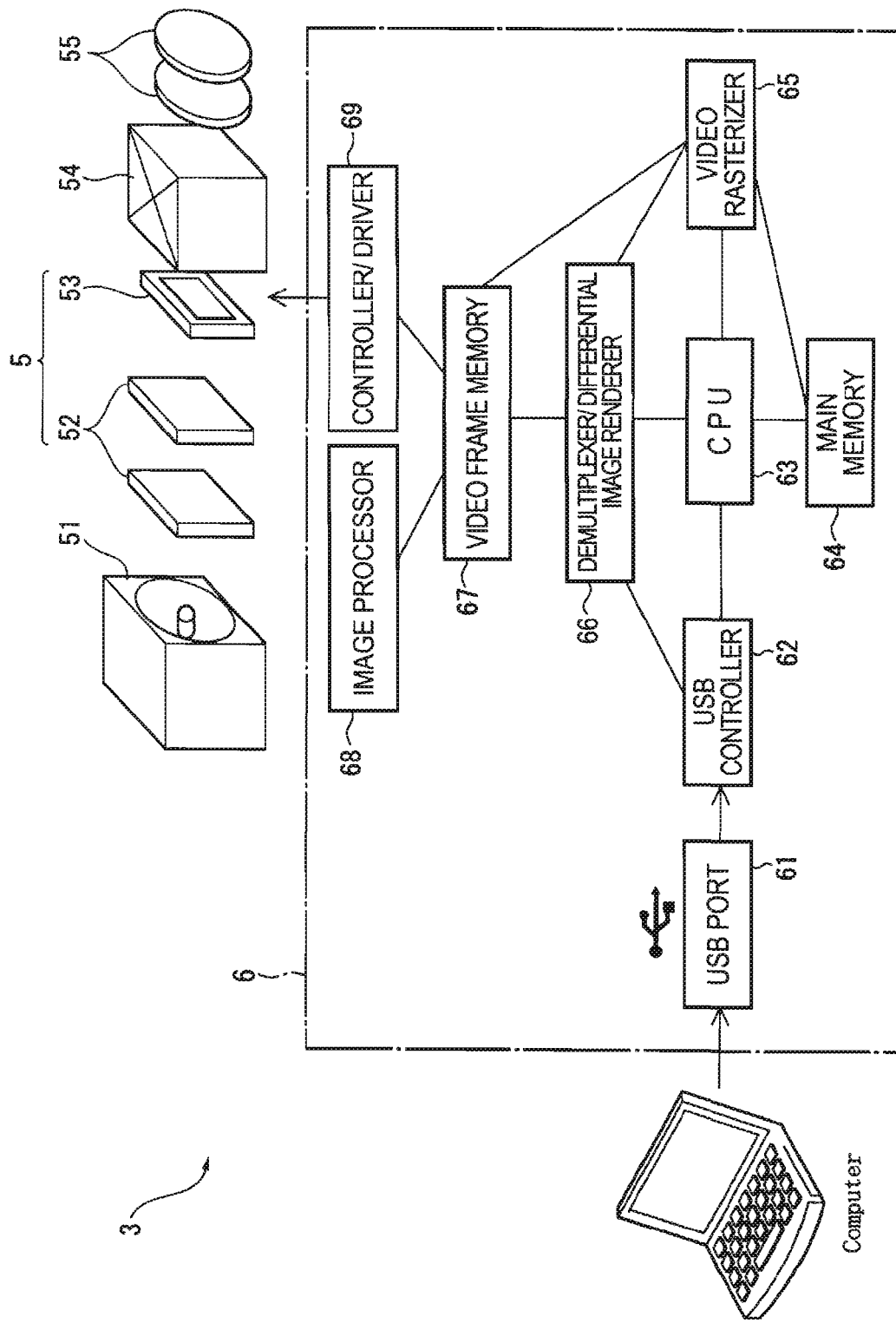
FIG. 5 is a schematic view illustrating a structure of an image display device according to the first embodiment of the invention.

As shown in FIG. 5, the projector 3 that serves as the image display device includes an optical engine 5 that forms an optical image, and an image processing unit 6 that performs an image process of the image data that is transmitted by the computer 2 and outputted to the projector 3.

The optical engine 5 includes a light source device 51, integrator illumination optical systems 52, a liquid crystal panel 53 that serves as an image forming device, a color synthesizing optical system 54, and projection lenses 55.

A light beam that is emitted from the light source device 51 is divided into a plurality of partial light beams by the integrator illumination optical systems 52 such that it becomes uniform illumination light, then subjected to optical modulation according to the image data inputted by the liquid crystal panel 53, and then projected onto the screen through the color synthesizing optical system 54 and the projection lenses 55. Although not shown in FIG. 4, in the projector 3 according to the first embodiment, color light of each of R, G, and B is optically modulated by the liquid crystal panel 53, and the color synthesizing optical system 54 is provided such that it synthesizes light beams of R, G, and B in which optical modulation is performed on each color light and obtains a color image.

The image processing unit 6 performs a predetermined image process on the basis of the image data inputted by the computer 2, and performs driving control of the liquid crystal panel 53 constituting the optical engine 5 so as to form an optical image so as to form an optical image. The image processing unit 6 is constructed to have various circuit elements that are mounted on a circuit board provided in the projector 3.

Specifically, the image processing unit 6 includes a USE port 61, a USE controller 62, a CPU 63, a main memory 64, a video rasterizer 65, a multiplexer 66, a video frame memory 67, an image processor 68, and a panel controller 69.

A USB cable 4 is connected to the USB port 61, and the USB port 61 is connected is a terminal to which image data from the computer 2 is inputted. The USB controller 62 is a circuit element that controls input and output of the USB port 61. In addition, the USB port 61 and the USE controller 62 form a data receiving unit according to the first embodiment of the invention.

The CPU 63 executes various programs while using a main memory 64 as a working region, and performs entire control of the image processing unit 6.

The video rasterizer 65 decodes moving picture data of a format, such as MPEG 2, and creates moving picture raster data, and the moving picture raster data that is decoded by the video rasterizer 65 is written in a video frame memory 67, which will be described in detail below.

The demultiplexer 66 that serves as a data demultiplexing unit separates a variety of data that is multiplexed by the data multiplexing unit 225 of the above-described computer 2, and the variety of separated data is processed by another circuit element, which will be described in detail below. Further, the demultiplexer 66 in the first embodiment also functions as a differential image renderer, which will be described in detail below.

The video frame memory 67 accumulates image raster data that is created by various circuit elements, and stores display raster data that is displayed on the liquid crystal panel 53. The display raster data is rewritten according to a data writing cycle of the liquid crystal panel 53 by the panel controller 69.

The image processor 68 that serves as a raster data synthesizing unit finally synthesizes the data separated by the demultiplexer 66, and creates the display raster data. In order to ensure color reproducibility of the liquid crystal panel 53, in addition to the synthesis of the graphic data and the moving picture data, a correction process, such as V-T γ correction, luminance and color irregularity correction, is performed on the liquid crystal panel 53.

The panel controller 69 that serves as a scanning unit is a circuit element that performs driving control of the liquid crystal panel 53, and driving control of each pixel in the image display region of the liquid crystal panel 53 is performed by the panel controller 69. Moreover, in the first embodiment, as described above, a three-plate-type projector 3 is used. Although not shown in the drawings, a panel controller 69 is provided on the liquid crystal panel 53 for each of R, G, and B.

As described above, in the first embodiment, the image processing unit 6 is constructed by combining a plurality of circuit elements, but the hardware configuration of the image processing unit is not necessarily limited thereto. If it is an operation processing device having an extremely high performance, all processes can be performed by a one-chip microprocessor.

Figure 6:
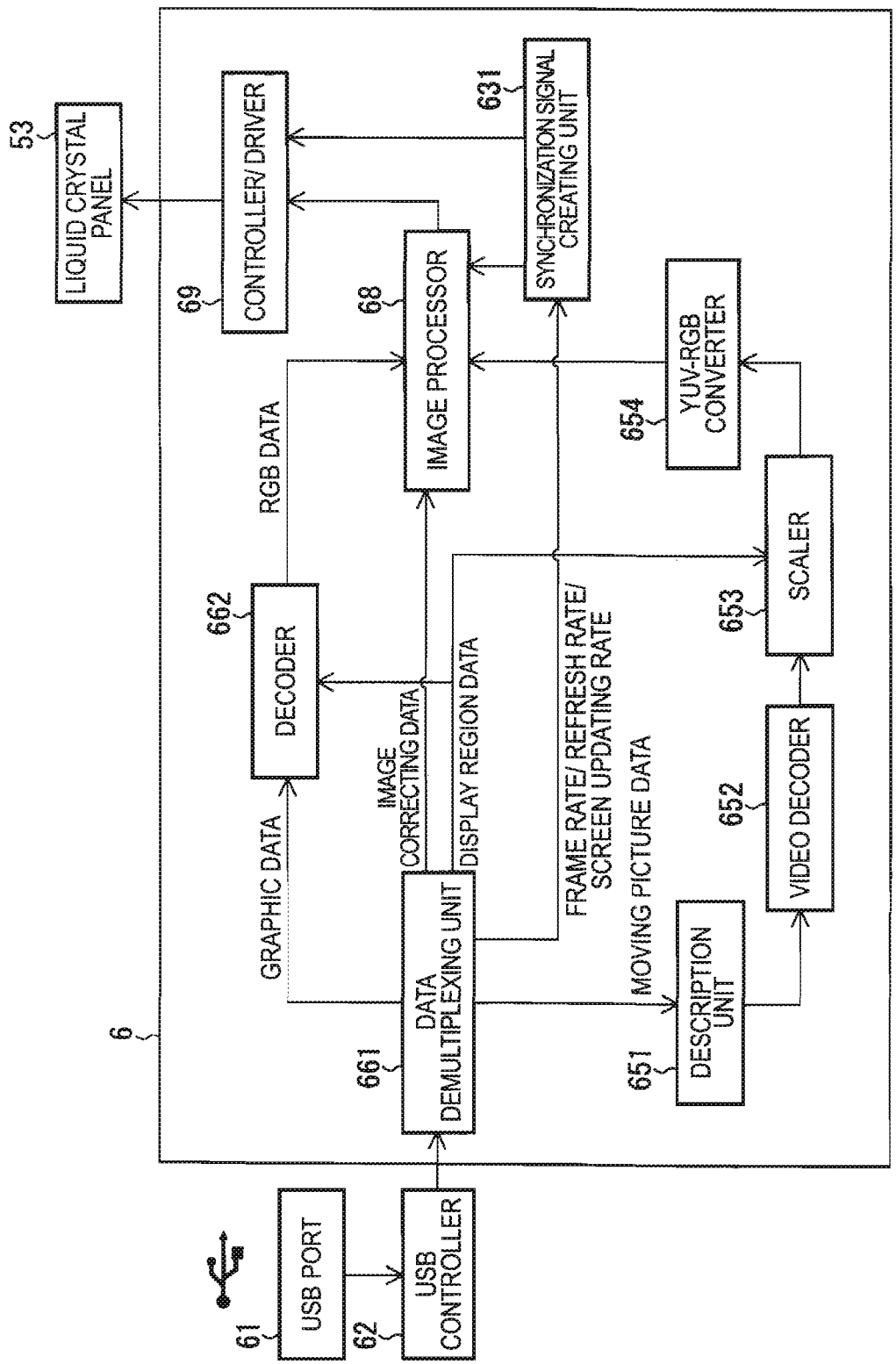
FIG. 6 is a functional block diagram of an image display device according to the first embodiment of the invention.

FIG. 6 shows a functional block structure of the above-described image processing unit 6.

Among the various circuit elements of the above-described image processing unit 6, the demultiplexer 66 includes a data demultiplexing unit 661 and a decoder 662 as functional units, and the video rasterizer 65 includes a decryption unit 651, a video decoder 652, a scaler 653, and a YUV-RGB converter 654 as functional units. Further, in order to take the synchronization of the screen updating, the CPU 63 includes a synchronization signal generating unit 631 as a functional unit.

The data demultiplexing unit 661 separates the multiplexed data inputted through the USB port 61 into individual data. Specifically, the data demultiplexing unit 661 separates the multiplexed data into graphic data, moving picture data, moving picture display region data, image correcting data, and image attribute information.

In addition, the data demultiplexing unit 661 outputs the separated graphic data to the decoder 662, outputs the moving picture data to the decryption unit 651, outputs the moving picture display region data to the decoder 662 and the scaler 653, and outputs information, such as the frame rate included in the image attribute information, and a refresh rate set by the computer 2, and a screen updating cycle of the graphic data inputted as the differential data, to the synchronization signal generating unit 631.

The decoder 662 functions as the above-described differential image renderer, and performs conversion such that the graphic data outputted by the data demultiplexing unit 661 becomes a graphic image constituting one screen. In this embodiment, as described above, the differential data is transmitted as the graphic data. Thus, the decoder 662 holds the graphic data before updating in the main memory 64. If graphic data as new differential data is inputted, rewriting of data is performed by a portion of the differential data so as to create new graphic data. The graphic data that is converted by the decoder 662 is outputted to the image processor 68 as the RGB data.

Further, on the basis of the moving picture display region data outputted by the data demultiplexing unit 661, the decoder 662 sets a region for displaying the moving picture in the graphic image, and the entire region is painted with a color which the image processor can use as a color key for synthesizing the moving pictures by overlay. In addition, the decoder 662 creates graphic data of the region other than the portions where the moving pictures are displayed.

Before decoding the inputted moving picture data, the decryption unit 651 restores a portion encrypted for copy prevention from the relationship of the copyright or the like, and performs a process making it decoded by the video decoder 652 provided at a rear stage. The decryption unit 651 does not necessarily need to be provided, and needs to be provided in the case of the moving picture data where copy protection is necessary.

The video decoder 652 decodes the moving picture data transmitted in a compressed state. For example, when the compression format is MPEG 2, the video decoder 652 decodes the moving picture data of the compressed state into the moving picture data of the raster data format through respective steps, such as decoding of a variable length code, inverse scanning, inverse quantization, inverse DCT, motion compensating.

The scaler 653 performs expansion and contraction adjustment of the decoded moving picture data. The scaler 653 sets a region for displaying moving picture data and a resolution in the corresponding region, on the basis of moving picture display region data outputted by the data demultiplexing unit 661, resolution information included in the moving picture data, a specification of the liquid crystal panel 53 and the like.

The YUV-RGB converter 654 converts data of a YUV format of the moving picture data into data of a RGB format that can be processed by the image display device. The conversion is performed on the basis of the predetermined relation.

As described above, the image processor 68 synthesizes the graphic data decoded by the decoder 662 and the moving picture data decoded by the video decoder 652, and creates display raster data. Further, the image processor 68 performs a correction process on the basis of image correction data that is outputted by the data demultiplexing unit 661 and set by the computer 2, and image correction data that is uniquely set to the liquid crystal panel 53, and writes the display raster data after correction in the video frame memory 67.

The synchronization signal generating unit 631 generates a screen updating synchronization signal of the panel controller 69 on the basis of information related to screen updating outputted by the data demultiplexing unit 661. In this embodiment, the synchronization signal is generated on the basis of a frame rate obtained from the serial header of the moving picture data. Further, the synchronization signal that is generated by the synchronization signal generating unit 631 is outputted to the image processor 68, and the image processor 68 sets writing timing of the display raster data in the video frame memory 67 on the basis of the synchronization signal.

Operation of Image and Sound Output System

Figure 7:
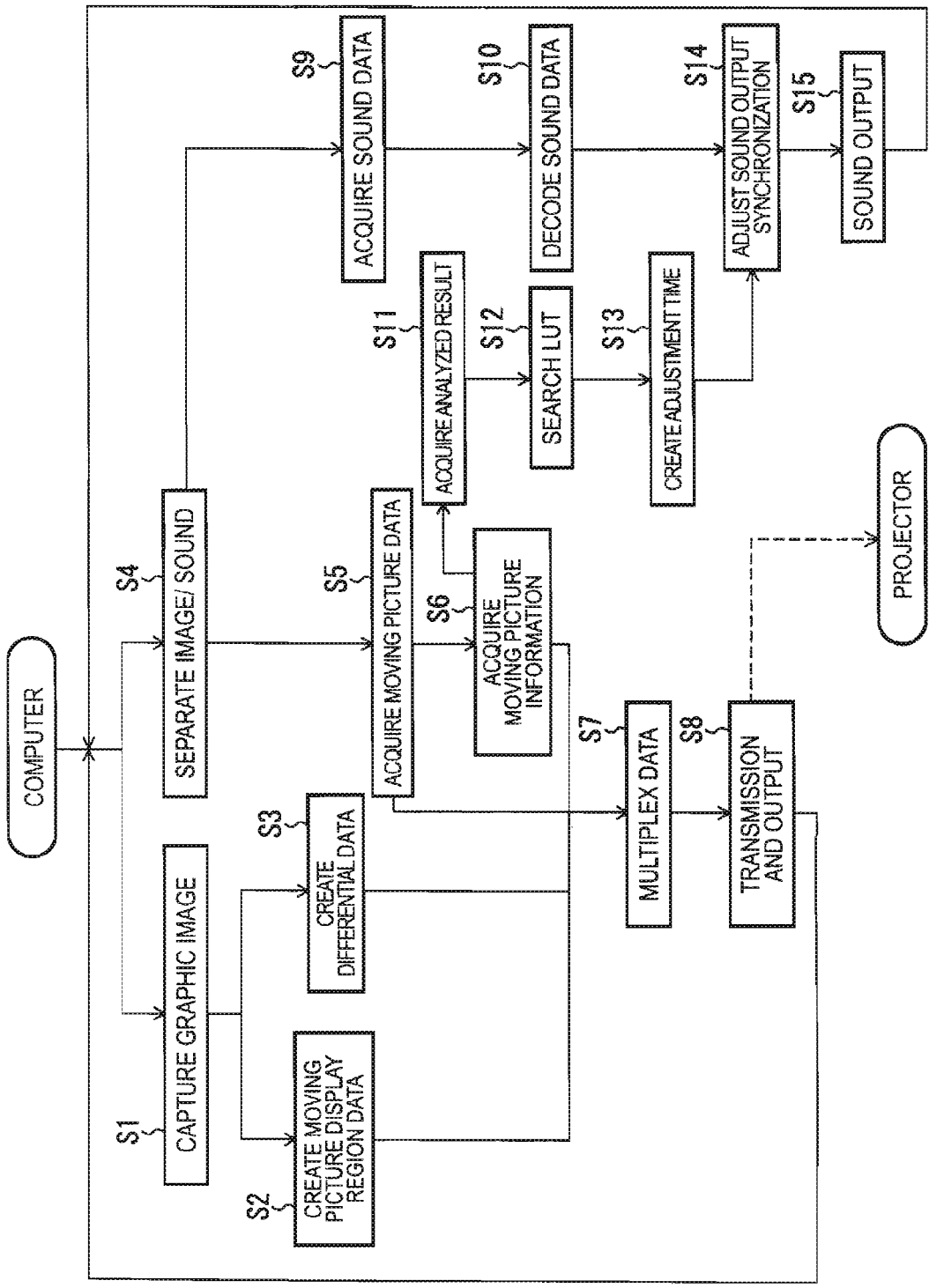
FIG. 7 is a flowchart illustrating the operation of an image and sound output system according to the first embodiment of the invention.
Figure 8:
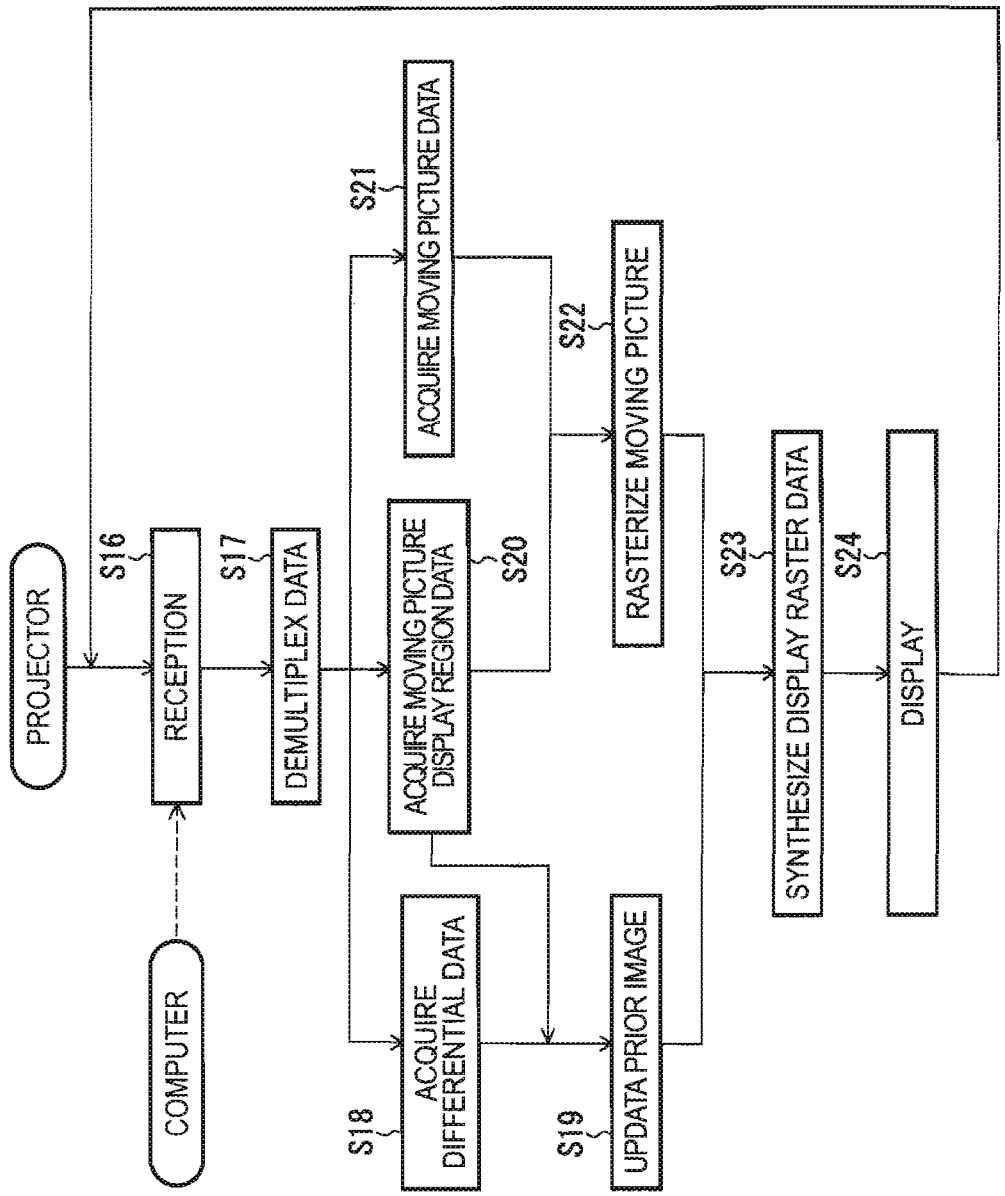
FIG. 8 is a flowchart illustrating the operation of an image and sound output system according to the first embodiment of the invention.

Next, the operation of the image and sound output system 1 that has the above-described structure will be described with reference to the flowcharts illustrated in FIGS. 7 and 8.

Process of Computer Side

First, the graphic image data acquiring unit 221 captures a graphic image that is currently being displayed, and acquires it as graphic data (process S1).

Then, the differential data creating unit 221A of the graphic image data acquiring unit 221 creates differential data that becomes the updated portion on the basis of the previously captured graphic image and the currently captured graphic image (process S2). In parallel with this process, the moving picture display region creating unit 222 creates the moving picture display region data, such as X-Y locations of the moving picture display region on the screen, and a size and a resolution of the moving picture display region, on the basis of the captured graphic images (process S3).

In parallel with the acquisition of the graphic data, the image and sound separating unit 226 separates the image and sound data inputted by the optical disk device 25 into the moving picture data and the sound data (process S4).

The moving picture data acquiring unit 223 acquires the separated moving picture data without performing a rasterizing process on it (process S5). Then, from portions of the acquired moving picture data, such as the sequence header and the sequence extension (the case of MPEG 2), the moving picture data analyzing unit 224 acquires information of the moving picture data, such as a frame rate, a bit rate, an aspect ratio, a resolution, as image attribute information (process S6).

If the variety of information described above is acquired, the data multiplexing unit 225 multiplexes the variety of obtained data in a format of the above-described MPEG-TS or MPEG-PS (process S7). The multiplexed data is encoded by the chipset 21 having a function as the USB controller, and then transmitted and outputted from the USB port 27 to the projector 3 through the USB cable 4 (process S8).

In the process S4, the separated sound data is acquired by the audio decoder 230 (process S9) and then decoded by the audio decoder 230 (process S10), and the decoded sound data is sequentially stored in the delay buffer 281.

In parallel with the above-described process, in the process S6, the moving picture data analyzing unit 224 outputs the analyzed result, such as the bit rate, the resolution, and the analyzed result is acquired by the sound output adjusting time creating unit 227 (process S11).

On the basis of the acquired analyzed result, the sound output adjusting time creating unit 227 searches the inside of the LUT 229 (process S12), and extracts a reproducing time according to the level and profile suitable for the analyzed result, or the bit rate and resolution. Then, the sound output adjusting time creating unit 227 creates a sound output adjusting time on the basis of the acquired reproducing time, and outputs the created sound output adjusting time to the sound output synchronization adjusting unit 228 (process S13).

On the basis of the created sound output adjusting time, the sound output synchronization adjusting unit 228 adjusts the timing of the sound data outputted from the delay buffer 281 to the D/A converter 282, and synchronizes the timing of the sound data with the timing of the moving picture display (process S14).

The D/A converter 282 sequentially converts the format of the sound data inputted by the delay buffer 281 into an analog format, amplifies it by the amplifier 283, and outputs the sound through the speaker 9 (process S15).

Process of Projector Side

The multiplexed data from the computer 2 is received by the USB port 61 and the USB controller 62 (process S16), then decoded by the USB controller 62 in a format that can be processed by the image processing unit 6, and then outputted to the data demultiplexing unit 661.

The data demultiplexing unit 661 separates the multiplexed data into individual graphic data, moving picture display region data, moving picture data, and image attribute information (process S17).

The decoder 662 acquires the separated graphic data as the differential data (process S18), and updates the graphic data where only a portion of the differential data is rewritten on the basis of the graphic image before updating (process S19).

In parallel with the process, the video rasterizer 65 acquires the moving picture data and the moving picture display region data (processes S20 and S21), and performs a rasterizing process of the moving picture on the basis of the moving picture data and the moving picture display region data, and the image attribute information included in the moving picture data (process S22).

If the rasterizing process of the graphic data by the decoder 662, and the rasterizing process of the graphic data by the video rasterizer 65 are completed, the image processor 68 synthesizes the respective rasterized data, and creates the display raster data (process S23). Further, the image processor 68 performs a unique image correction process on the liquid crystal panel 53, forms an optical image on the liquid crystal panel 53 through the scanning by the panel controller 69, and displays the projection image on the screen through the projection lens 55 (process S24).

According to the first embodiment of the invention, since the moving picture output and the sound output are synchronized with each other by the internal process at the computer 2 side by means of the sound output synchronization adjusting unit 228, the image output timing and the sound output timing coincide with each other by using the delay buffer 281 of the sound card 28. Accordingly, a communication processing program for processing the delay time information does not need to be loaded on the sound card 28, which results in reducing the manufacture cost thereof.

Further, since the sound output adjusting time according to the compression format of the image data is created by the moving picture data analyzing unit 224, the sound can be outputted with optimal timing according to the compression format of the image data.

Further, on the basis of the analyzed result by the moving picture data analyzing unit 224, the sound output adjusting time creating unit 227 searches the inside of the LUT 229, and creates the sound output adjusting time. Therefore, the sound output adjusting time can be created with a simple process.

Second Embodiment

Then, a second embodiment of the invention will be described. In the description below, the same constituent elements as those of the first embodiment are denoted by the same reference numerals, and the description thereof will be omitted.

In the first embodiment, as shown in FIG. 3, the sound output synchronization adjusting unit 228 adjusts the sound data output timing by the sound output adjusting time by delaying the output of the sound data stored in the delay buffer 281 constituting the sound card 28.

Figure 9:
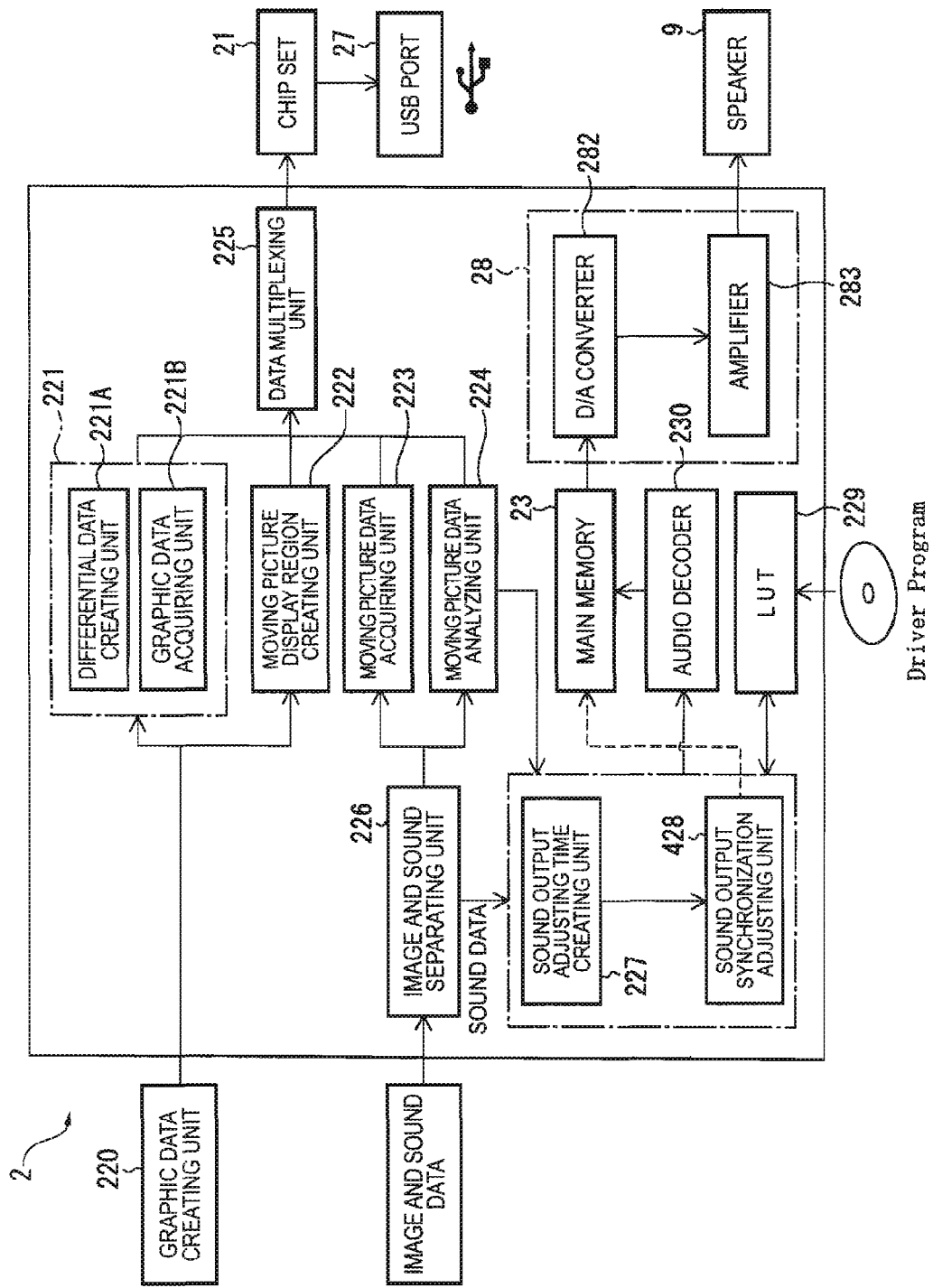
FIG. 9 is a functional block diagram of an image data output device according to a second embodiment of the invention.

However, in the image output data device according to the second embodiment, as shown in FIG. 9, when outputting the sound data decoded by the audio decoder 230, the output timing of the sound data to the sound card 28 is adjusted on the basis of the sound output adjusting time.

That is, as shown in FIG. 9, the sound output synchronization adjusting unit 428 according to the second embodiment is constructed such that it delays the sound data decoded by the audio decoder 230 according to the sound output adjusting time created by the sound output adjusting time creating unit 227 and outputs it to the sound card 28, in the step of storing the sound data in the main memory 23 attached to the CPU 22.

Even in the second embodiment, it is possible to achieve the same functions and effects as the first embodiment.

Third Embodiment

Next, a third embodiment of the invention will be described.

In the first embodiment, the creating of the sound output adjusting time by the sound output adjusting time creating unit 227 is based on only the analyzed result by the moving picture data analyzing unit 224.

Figure 10:
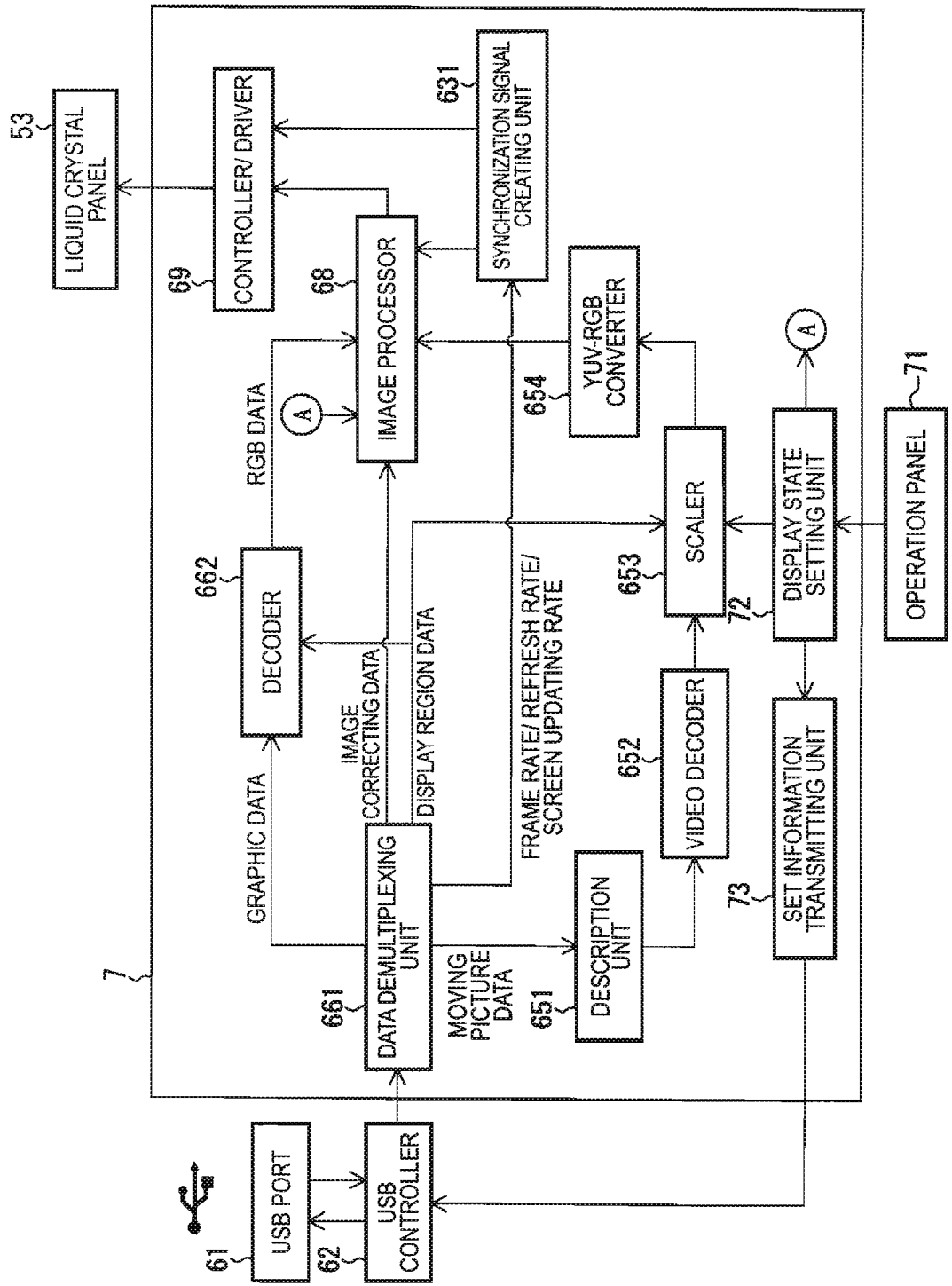
FIG. 10 is a functional block diagram of an image display device according to a third embodiment of the invention.
Figure 11:
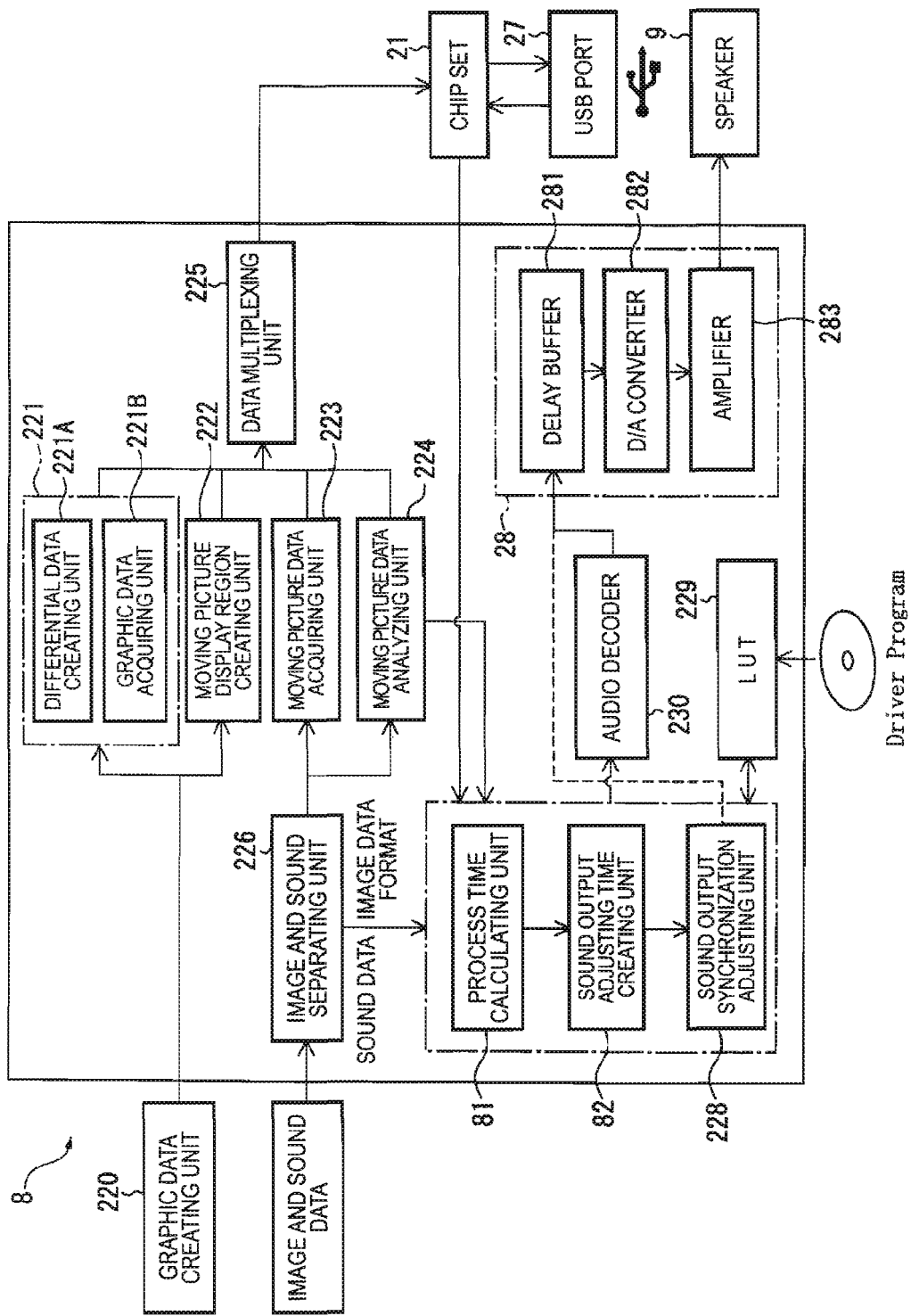
FIG. 11 is a functional block diagram of an image and sound data output device according to the third embodiment of the invention.

However, in the image and sound output system according to the third embodiment, as shown in FIGS. 10 and 11, when display setting is varied at the side of the image processing unit 7 of the projector, the setting information is outputted from the image processing unit 7 of the projector to the computer 8, and the computer 8 adds the time necessary for an image process according to the changed setting information, and creates the sound output adjusting time.

Specifically, as shown in FIG. 10, the image processing unit 7 of the projector includes an operation panel 71, a display state setting unit 72, and a setting information transmitting unit 73, in addition to the image processing unit 6 according to the first embodiment.

The operation panel 71 includes a plurality of switch groups that are provided in an exterior case of the projector. A viewer can operate the operation panel 71 or operate the computer connected through the USB cable to vary a color of the projected image by the projector to a preference color. Also, the viewer can convert a scanning form of the inputted moving picture data, for example, an interlace form into a progressive form by a desired method, or vary a trapezoidal projection image projected onto the screen into a predetermined rectangular projection image.

The display state setting unit 72 varies a set value in each functional unit on the image processing units 7 on the basis of the operation signal outputted by operating the operation panel 71. For example, the display state setting unit 72 is constructed such that it can vary a set value of the scaler 653 or a set value in the image processor 68.

The setting information transmitting unit 73 acquires the information set by the display state setting unit 72, and transmits and outputs the setting information to the computer 8 through the USB controller 62 and the USB port 61.

As shown in FIG. 11, the computer 8 receives the setting information transmitted from the projector side by using a USB control function of the chipset 21, and the received setting information is processed by the process time calculating unit 81 and the sound output adjusting time creating unit 82.

The process time calculating unit 81 calculates a process time according to each process on the basis of the received setting information. Although not shown in this embodiment, the process time calculating unit 81 calculates a process time necessary for each process by referring to the LUT where a process time according to the set processes stored in the LUT 229 is stored.

Similar to the first embodiment, the sound output adjusting time creating unit 82 creates the sound output adjusting time on the basis of the analyzed result by the moving picture data analyzing unit 224, and the process time calculated by the process time calculating unit 81.

Figure 12:
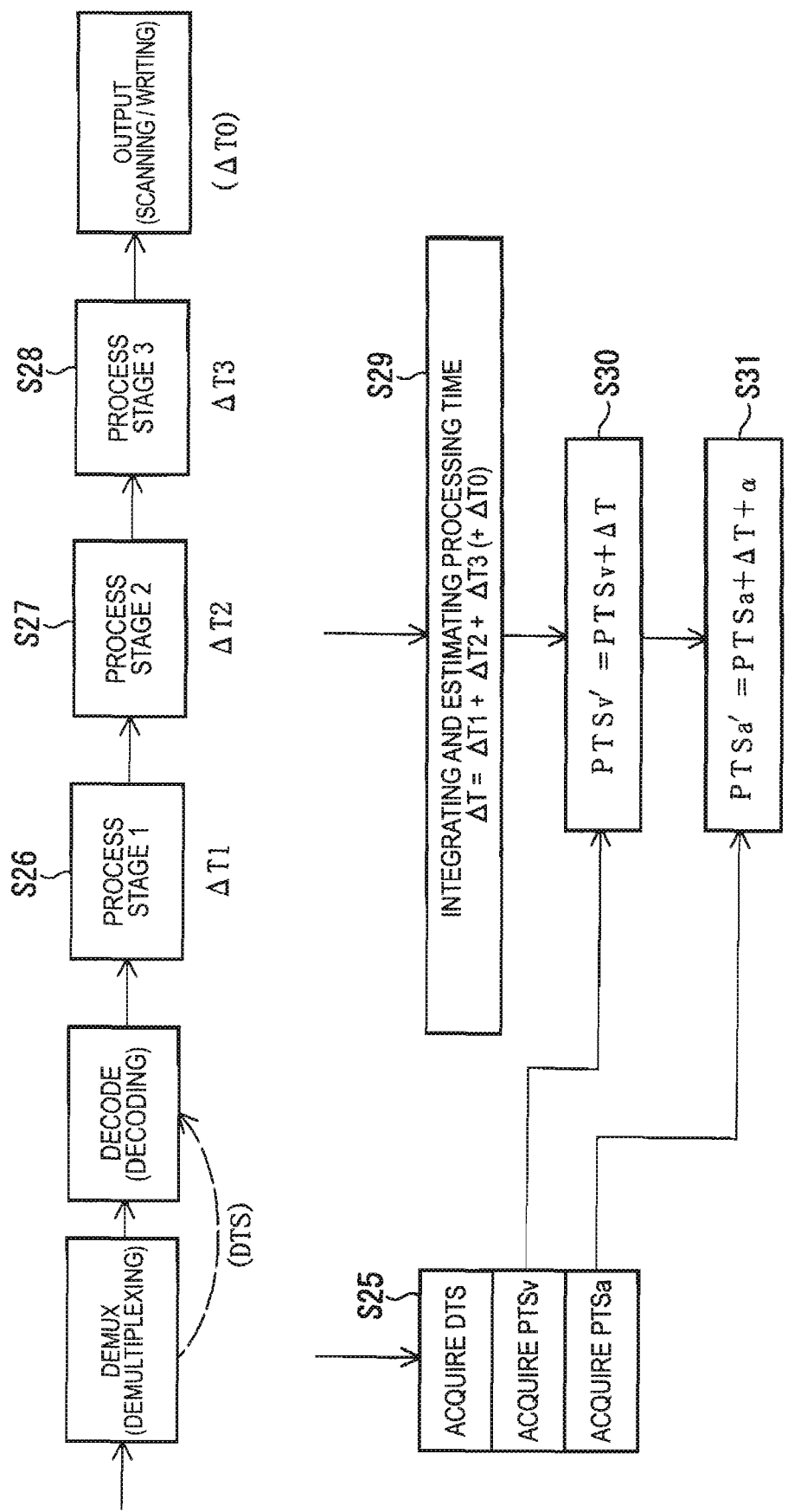
FIG. 12 is a schematic view illustrating the operation of the third embodiment of the invention.

Hereinafter, a sequence of creating the sound output adjusting time by the sound output adjusting time creating unit 82 will be described with reference to a schematic diagram shown in FIG. 12.

First, on the basis of the analyzed result by the moving picture data analyzing unit 224, the sound output adjusting time creating unit 82 acquires a time DTS (Decoding Time Stamp) when any frame is restored, a time PTSv (Video Presentation Time Stamp) when any frame is displayed, and a time PLSa (Audio Presentation Time Stamp) when sound output according to any frame is performed, and acquires a basic decoding and reproducing process time of the moving picture data (process S25).

Meanwhile, on the basis of the setting information transmitted from the projector side, the process time calculating unit 81 discriminates the performed processes, and calculates a process time according to each setting stage (processes S26 to S28). For example, in this embodiment, setting processes of three stages are preformed. In this case, IP conversion is considered as a process of Stage 1, scaling is considered as a process of Stage 2, and γ correction is considered as a process of Stage 3.

If the process times ΔT1 to ΔT3 are calculated by the process time calculating unit 81, the sound output adjusting time creating unit 82 calculates an integrating and estimating processing time ΔT obtained by integrating the respective times (process S29).

The sound output adjusting time creating unit 82 adds the integrating and estimating processing time ΔT to the PTSv obtained by the process S25, and calculates an output time PTSv' of any frame when the setting process is added (process S30).

Finally, the sound output adjusting time creating unit 82 calculates the time PTSa' of the sound output according to the output time of the frame from the PTSa obtained on the basis of PTSv' (process S31). In this embodiment, when the time PTSa' of the sound output is calculated, not only the integrating and estimating time ΔT but also margin time α are added to the acquired PTSa, and the time PTSa' of the sound output is calculated. This is based on the characteristic of the viewer that if the sound is first outputted before the moving picture is changed, the uncomfortable feeling is generated, while even though the sound output is slightly delayed as compared with the variation of the moving picture, the uncomfortable feeling is not generated.

Further, in this embodiment, the setting processes have been described by dividing the setting processes into three stages including the processes S26 to S28, but the invention is not limited thereto. More processes can be performed by adding the process times of the respective processes.

According to this embodiment, the projector includes a setting information transmitting unit 73, and the image and sound data processing device includes the setting information receiving units 21 and 27, and the process time calculating unit 81. As a result, when the setting of the display state is changed at the projector side, the sound output adjusting time creating unit 82 also adds the image processing time and creates the sound output adjusting time. Therefore, the sound can be outputted with timing close to the image output timing.

Modifications

The invention is not limited to the above-described embodiments, and various changes and modifications can be made within a range capable of achieving the advantages of the invention.

For example, in the above-described embodiments, the computers 2 and 8 have been adopted as the image and sound data output device, but the invention is not limited thereto. That is, a device such as a DVD reproducing device and a game machine may be adopted as the image and sound data output device.

Further, in this embodiment, the liquid crystal projector 3 has been adopted as the image display device, but the invention is not limited thereto. The invention may be applied to a projector including an optical modulation device other than the liquid crystal device like a DLP, or a display, such as a liquid crystal display of a backlight form, a plasma display, an organic EL display.

Further, in the above-described embodiments, the USE cable 4 has been adopted as the transmission path connecting the computer 2 and the projector 3, but the invention is not limited thereto. That is, even though a system, such as a LAN, which can connect the image data output device and the image display device as the transmission path capable of transmitting the image, is used, the invention can be applied.

Further, the specific structure and shape in the embodiments of the invention may be changed to another structure and shape within a range capable of achieving the advantages of the invention.

The entire disclosure of Japanese Patent Application No. 2005-271035, filed Sep. 16, 2005 is expressly incorporated by reference herein.

What is claimed is:

1. An image and sound output system comprising:
   an image and sound data output device capable of outputting image and sound data; and
   an image display device that is connected to the image and sound data output device through a transmission path and displays an image on the basis of the image data outputted by the image and sound data output device,
   wherein the image and sound data output device includes:
   a image and sound data separating unit that separates the image data and the sound data included in the image and sound data;
   an image data transmitting unit that transmits the separated image data to the image display device through the transmission path;
   a sound data output unit that outputs the separated sound data;
   an image data analyzing unit that determines a bit rate of the image data transmitted to the image display device by the image data transmitting unit;
   a process time calculating unit that calculates an image processing time on the basis of setting information which indicates a variation of a set value of the image display device;
   a sound output adjusting time creating unit that creates a sound output adjusting time, the sound output adjusting time creating unit adapted to:
      acquire an adjusting time on the basis of the bit rate of the image data determined by the image data analyzing unit, where the bit rate of the image data is associated, in a lookup table, with a predetermined adjusting time, and
      add the image processing time to the adjusting time so as to create a sound output adjusting time; and
   a sound output synchronization adjusting unit that adjusts sound output by the separated sound data in synchronization with timing of reproducing an image displayed by the image display device, on the basis of the sound output adjusting time created by the sound output adjusting time creating unit, and the image display device includes:
- an image data receiving unit that receives image data transmitted by the image and sound data output device;
- a display state setting unit that varies the set value of the image display device;
- a setting information transmitting unit that transmits the setting information to the image and sound data output device through the transmission path;
- an image processing unit that performs a reproducing process on the image data received by the image data receiving unit based on the set value that was varied; and
- an image forming unit that forms an image on the basis of the image data processed by the image processing unit.

2. The image and sound output system according to claim 1,
wherein the image and sound data output device further includes a reproducing time recording unit having the lookup table in which a reproducing time according to any one of a resolution and the bit rate of the image data or a combination of the resolution and the bit rate of the image data is recorded, and
the sound output adjusting time creating unit refers to the lookup table recorded in the reproducing time recording unit so as to create a sound output adjusting time.

3. The image and sound output system according to claim 1,
wherein the transmission path enables bidirectional communication to be performed, and
the image and sound data output device further includes:
a setting information receiving unit that receives the setting information transmitted by the image display device.

4. An image and sound data output device, which is capable of outputting image and sound data, and outputs the image data to an image display device connected to the image and sound data output device through a transmission path enabling bidirectional communication so as to display images, the image and sound data output device comprising:
- a image and sound data separating unit that separates the image data and the sound data included in the image and sound data;
- an image data transmitting unit that transmits the separated image data to the image display device through the transmission path;
- a sound data output unit that outputs the separated sound data;
- an image data analyzing unit that determines a bit rate of the image data transmitted to the image display device by the image data transmitting unit;
- a process time calculating unit that calculates an image processing time on the basis of setting information which indicates a variation of a set value of the image display device;
- a sound output adjusting time creating unit that creates a sound output adjusting time, the sound output adjusting time creating unit adapted to:
  - acquire an adjusting time on the basis of the image data attributes determined by the image data analyzing unit, where the bit rate of the image data is associated, in a lookup table, with a predetermined adjusting time,
  - add the image processing time to the adjusting time so as to create a sound output adjusting time; and
- a sound output synchronization adjusting unit that adjusts sound output by the sound data output unit based on the separated sound data in synchronization with timing of reproducing an image displayed by the image display device, on the basis of the sound output adjusting time created by the sound output adjusting time creating unit.

* * * * *